United States Patent
Blackham et al.

[11] Patent Number: 6,042,238
[45] Date of Patent: Mar. 28, 2000

[54] IMAGE PROJECTION DISPLAY SYSTEM FOR USE IN LARGE FIELD-OF-VIEW PRESENTATION

[75] Inventors: Geoffrey Howard Blackham, Hassocks; Roger Alan Edwards, Bicester, both of United Kingdom

[73] Assignee: SEOS Displays Limited, West Sussex, United Kingdom

[21] Appl. No.: 09/101,707

[22] PCT Filed: Jan. 15, 1997

[86] PCT No.: PCT/GB97/00108

§ 371 Date: Jul. 15, 1998

§ 102(e) Date: Jul. 15, 1998

[87] PCT Pub. No.: WO97/26638

PCT Pub. Date: Jul. 24, 1997

[30] Foreign Application Priority Data

Jan. 17, 1996 [GB] United Kingdom .................... 9600956
Oct. 14, 1996 [GB] United Kingdom .................... 9621374

[51] Int. Cl.⁷ .................................................. G03B 21/28
[52] U.S. Cl. ................................ 353/94; 353/30; 353/99; 434/44
[58] Field of Search .................................. 353/98, 30, 99, 353/94; 348/36, 39, 121, 123, 747, 785, 786, 827; 359/449; 434/43, 44, 38, 55

[56] References Cited

U.S. PATENT DOCUMENTS 3,784,742  1/1974  Burnham et al. .
3,785,715  1/1974  Mecklenborg .
3,880,509  4/1975  Herndon ..................................... 353/12
3,895,861  7/1975  Herndon .
3,949,490  4/1976  Derderian et al. .
4,463,380  7/1984  Hooks ...................................... 364/522
4,473,355  9/1984  Pongratz ................................... 434/44
4,505,558  3/1985  Albers et al. ............................. 353/30
5,253,116  10/1993  Lacroix .................................... 434/44
5,255,211  10/1993  Redmond .
5,264,881  11/1993  Brooke ..................................... 353/30
5,539,483  7/1996  Nalwa ...................................... 353/30
5,566,370  10/1996  Young ...................................... 434/44
5,626,410  5/1997  Chambers et al. ......................... 353/30
5,873,726  2/1999  Gillbe ...................................... 434/29

FOREIGN PATENT DOCUMENTS

0 358 559   5/1989  European Pat. Off. .
0 514 045 A1  4/1992  European Pat. Off. .
WO 95/32489  5/1995  WIPO .

Primary Examiner—William Dowling
Attorney, Agent, or Firm—Iandiorio & Teska

[57] ABSTRACT

An image projection display system for use in large field-of-view presentations, which image projection display system comprises a fold mirror arrangement and a plurality of projection devices, the image projection display system being such that light beams from the projection devices are optically combined by the fold mirror arrangement so as to appear to be projected from essentially a common equivalent eye point, whereby the displayed information of adjacent projected displays is able to be correctly aligned with respect to a design eye point without the need to apply distortion to the images.

7 Claims, 6 Drawing Sheets

IMAGE PROJECTION DISPLAY SYSTEM FOR USE IN LARGE FIELD-OF-VIEW PRESENTATION

This invention relates to an image projection display system for use in large field-of-view presentation. The large field-of-view presentation may be, for example, simulation, leisure, computer aided design or visualization where multi-channel displays are to be used to immerse the observer to some degree in an alternative environment.

Simulation such for example as flight, vehicle, marine or leisure simulation often requires a high fidelity image display system to be connected to the simulation apparatus. The high fidelity visual system should ideally be such that it gives a display equivalent to a person looking out of a window, the display thus being known as an out-of-the-window display. The simulation apparatus comprises three major components, that is a computer image generator, a simulated real world database which is loaded into the computer image generator, and the image projection display system. The image projection display system is used to present a real-time out-of-the-window scene to a person using the simulation apparatus, for example a pilot in the case of flight simulation or a driver in the case of vehicle simulation. The input to the image projection display system is provided by the computer image generator. The computer image generator forms the image in real time, in response to stimulus from the person using the simulation apparatus. Many approaches to out-of-the-window visual displays are known, including the use of direct-view graphics monitors, collimated monitor optics, real image wide-angle projection, and collimated wide-angled projection.

Known image projection display systems for use in simulation apparatus comprise at least one projection device and an optical system that provides a surface upon which an image is formed and which the person utilizing the simulation apparatus can view, either directly or indirectly. Optical considerations, limitations of display technologies, and other factors such for example as computer image generator limitations, normally result in the need to use multiple image generation channels and hence projected display channels, to form a single image to the person. The formation of a single image from the multiple images requires that projected images from each channel at least abut, and that information displayed by each projected channel correlates both with the simulated real-world coordinate system, and with adjacent channels. It is normal in high fidelity simulation that adjacent projected channels overlap by a margin sufficient to allow the blending of image contributed by each channel, a process whereby the image is faded out at the edge of adjacent channels such that intensity variations are minimised. Image content in the overlap region is common to each channel.

The known image display systems usually use cathode ray tube projectors. The cathode ray tube projectors suffer a number of undesirable attributes, most notably complexity, stability, limited operational life, size and mass. Further, multiple projection lenses are required to project separate red, green and blue images that must be converged at the screen surface.

An alternative to using image projection display systems with cathode ray tube projectors is to use image projection display systems with fixed matrix display devices, for example fixed matrix liquid crystal display devices. If used in an off-axis projection display device, image distortion is applied either by the computer image generator or by a separate digital remapping system. In the first instance, the total performance and/or cost of the computer image generator is compromised. In the second instance, the total display resolution is degraded and/or cost is compromised.

It is an aim of the present invention to provide an image projection display system which uses a plurality of fixed matrix display devices, but without the need to apply corrections, whilst at the same time maintaining total display requirements. This enables the present invention to utilize the advantages of fixed matrix display devices over cathode ray tube projectors, most notably stability, size and mass (for a given light output), reliability, long operational life, low maintenance requirement, and the ability to use a single lens to project a full colour image.

Accordingly, the present invention provides an image projection display system for use in large field-of-view presentation, which image projection display system comprises a fold mirror arrangement and a plurality of projection devices, characterised by the projection devices having an apparent common projection point, and the image projection display system being such that light beams from the projection devices are optically combined by the fold mirror arrangement so as to appear to be projected from essentially a common equivalent eye point such that the displayed information of adjacent projected displays is correctly aligned with respect to a design eye point without the need to apply distortion to the images.

The fold mirror arrangement may be such that it is a number of plane mirror surfaces each of which is placed in the path of a projected image beam and which has the effect of reflecting the projected image beam about the normal to the plane mirror surface, thereby making the beam appear to have been projected from a point other than the actual projection point. There will normally be one plane mirror for each one of the projection devices.

In the image projection display system of the present invention, the displayed information within each projected channel is correctly aligned within the channel, including across the boundary.

The image projection display system may be one in which the images are formed on a back projection screen which is viewed via a concave mirror to provide an essentially collimated display, said image projection display system being such that a common projection point is located sufficiently close to the equivalent eye point to ensure required geometrical accuracy.

The image projection display system may be one in which the images are formed on a screen which is viewed directly by the user, said image projection display system being such that a common projection point is located sufficiently close to the equivalent eye point to ensure required geometrical accuracy.

The image projection display system may be one in which the told mirror arrangement performs optical blending between adjacent channels so that essentially constant luminance across the region of overlap of adjacent projected images is achieved.

In the case of real image projection, the equivalent eye point is the design eye point itself. In the case of collimated projection, the equivalent eye point is the point within a rear projection screen enclosed volume from which the fields of view of the individual channels are correctly defined. The single lens output nature of alternative projection technologies is exploited in the realization of this arrangement.

The image projection, display system of the present invention is such that, without distortion of the geometric image, either at the projection display device or the image source, the following total display requirements are able to be maintained to within a specified accuracy.

(a) Display geometry—objects and features of the image appear to be correctly positioned when measured at the eye point of the person using the simulation apparatus.

(b) Edge match geometry—objects and features that exist in the region of the boundary between display channels do not exhibit discontinuities as they pass through the boundary.

(c) Optical blending—the image projection display system should be capable of being provided with appropriate optical blending apparatus for effecting required optical blending.

(d) Field of view—the subtense of the continuous image measured at the eye point of the person using the simulation apparatus.

If desired, the image projection display system may be such that by suitable scaling and positioning of mirrors with respect to projection lenses and screen surface, the edges of the mirrors act as a mask edge that result in optical "fading" at the boundaries of the image at the screen. Suitable disposition of adjacent channels would then result in optically blended images.

The image projection display system of the invention is advantageous in that a fixed matrix projector can be used within the display system and still achieve geometric distortion performance within acceptable limits. However, if desired, some non-fixed-matrix type projectors may also be used. With any projector type, elimination of the geometric distortion requirement allows for more effective use of the active display area and may also allow a lower cost unit to be used.

The present invention also provides large field-of-view presentation apparatus provided with the image projection display system. The large field-of-view presentation apparatus is preferably simulation apparatus. However, although the image projection display system has primarily been designed for a real-time simulation application, there are applications, such as leisure rides, that would use pre-generated image sequences, including film-derived, that would not require an image generator or database to generate the signals for the display system.

The large field-of-view presentation apparatus may include a computer image generator. The large field-of-view presentation apparatus may also include a simulated real world database loaded into the computer image generator.

Embodiments of the invention will now be described solely by way of example and with reference to the accompanying drawings in which.

Figure 1:
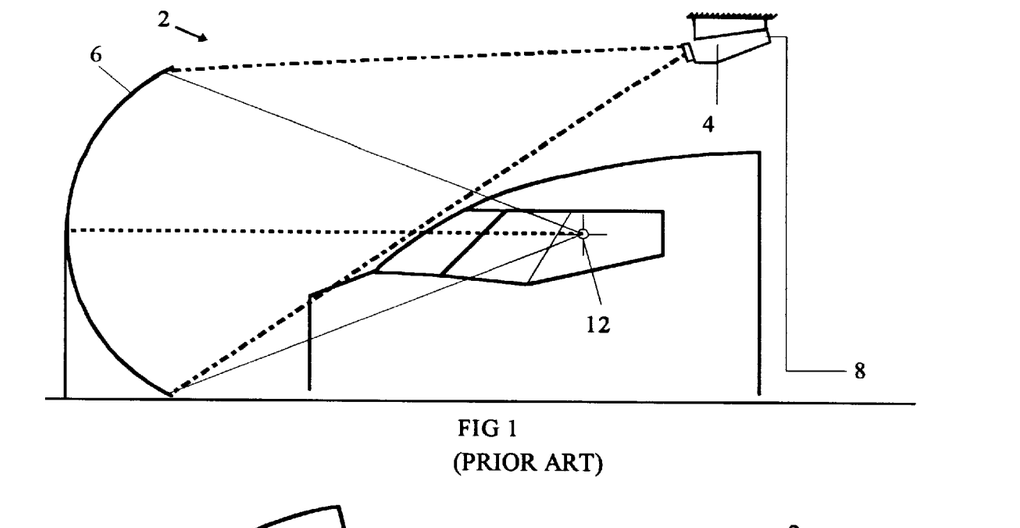
FIG. 1 is a side view of a typical known direct view front image projection display system.
Figure 2:
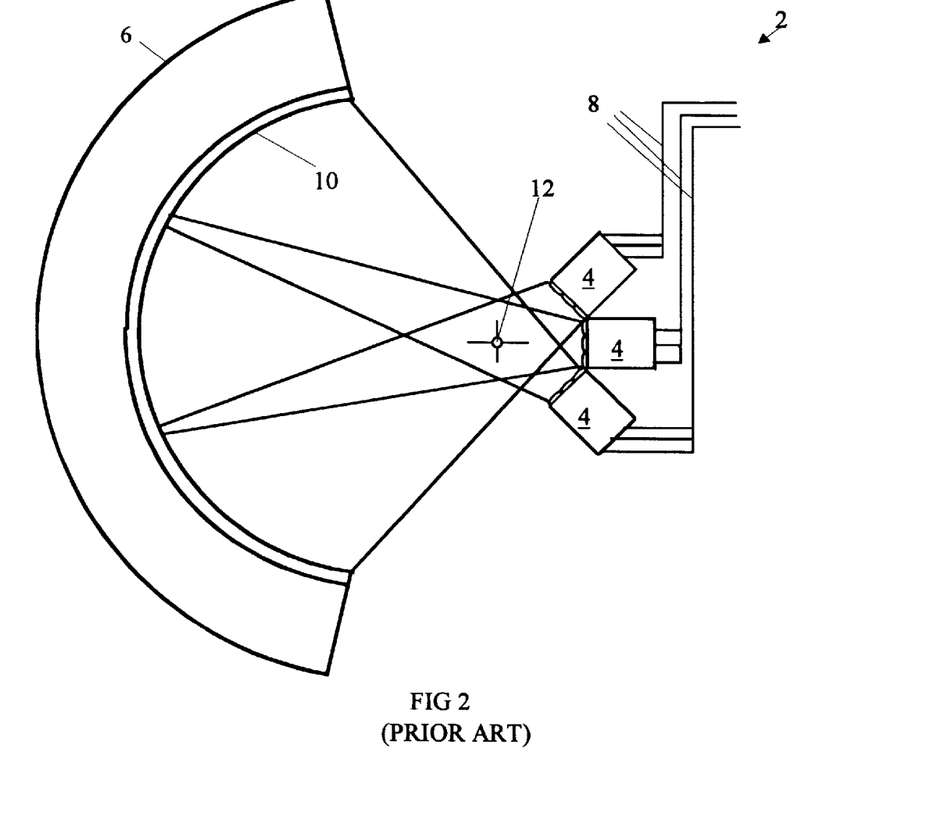
FIG. 2 is a plan view of the image projection display system shown in FIG. 1.

Referring to FIGS. 1 and 2, there is shown a known direct view front image projection display system 2 comprising three off-axis projectors 4 and a screen 6.

Video signals from an image generator (not shown) are transmitted to the projectors 4 via lines 8. The three projectors 4 form a continuous image directly on a surface 10 visible from a design eye point 12 of the image display system 6. The three projectors 4 are cathode ray tube projectors 4 which project through the vertical axis of the screen 6. Lens design considerations of costs and performance generally result in projection cone angles which require that the projector-to-screen distances are greater than the horizontal screen radius. The projection cone angles are those angles occupied by the light emitted from the cathode ray tube/lens combination measured from a lens reference point.

Figure 3:
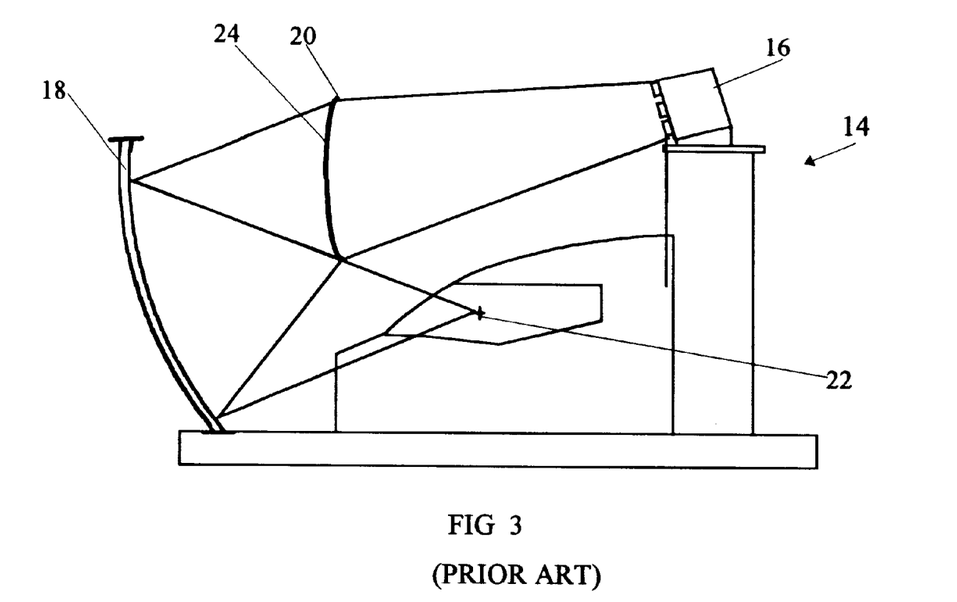
FIG. 3 is a side view of a typical known simulator collimated image projection display system employing vertical-in-line cathode ray tube projectors.
Figure 4:
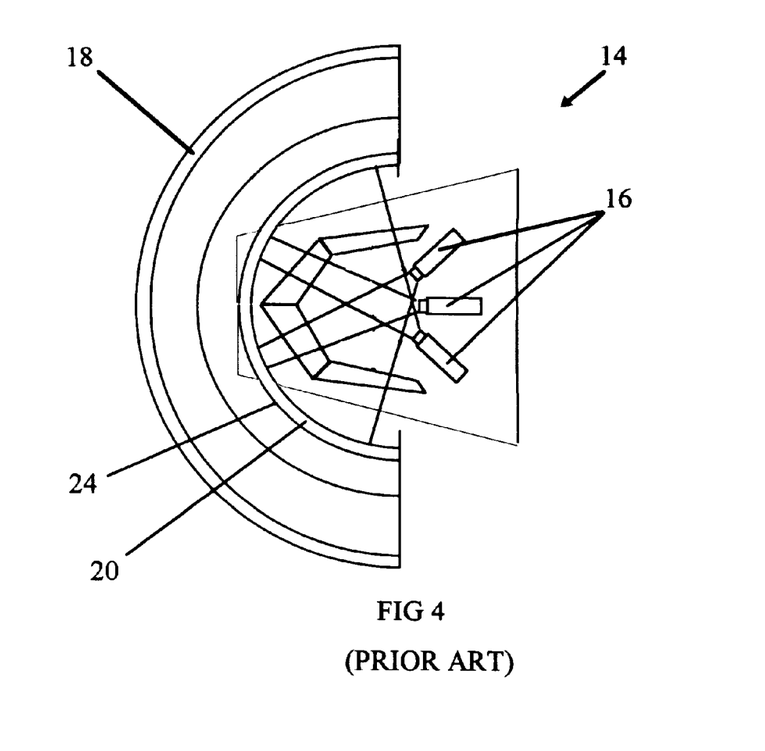
FIG. 4 is a plan view at a slightly different scale of the display system shown in FIG. 3, with the cathode ray tube projectors being shown side by side for ease of illustration.

FIGS. 3 and 4 show a collimated image projection display system 14 using cathode ray cube projectors 16. The image display system 14 comprises a collimating mirror 18 and a rear projection screen 20. The image display system 14 has a design eye point 22.

A person using simulation apparatus utilizing the image display system 14 views the image on the outer surface 24 of the rear projection screen 20, via the collimating mirror 18. As can be seen, the collimating mirror 18 is a spherical collimating mirror. Other types of collimating mirrors can be employed. The rear projection screen 20 is of significantly smaller radius than that of the front projection system. Therefore, for similar field of view coverage and cathode ray tube/lens characteristics, the cathode ray tube projectors 16 have been placed close together. As can be seen from FIG. 3, the cathode ray tube projectors 16 are arranged vertically in line, to enable closer spacing of the projectors 16, although the projectors 16 are still placed behind the horizontal centre of curvature of the rear projection screen 20.

All image projection systems are designed such that, when they are fitted to the simulation apparatus, the resultant image fulfils the total requirement. For the present invention, particular parameters within the total requirement are as follows.

(a) Geometric accuracy—objects and features of the image should appear to be correctly positioned within a given limit when measured at the eye point of the person using the simulation apparatus.

(b) Edge match accuracy—objects and features that exist in the region of the boundary between display channels should not exhibit discontinuities as they pass through the boundary.

(c) Channel overlap luminance variation—where the projected channels overlap and hence superimpose image information in the boundary regions, the resultant variation in luminance, where there should ideally be no variation, should be within specified limits.

(d) Field of view—the subtense of the continuous image measured at the eye point of a person using the simulation apparatus.

Figure 5:
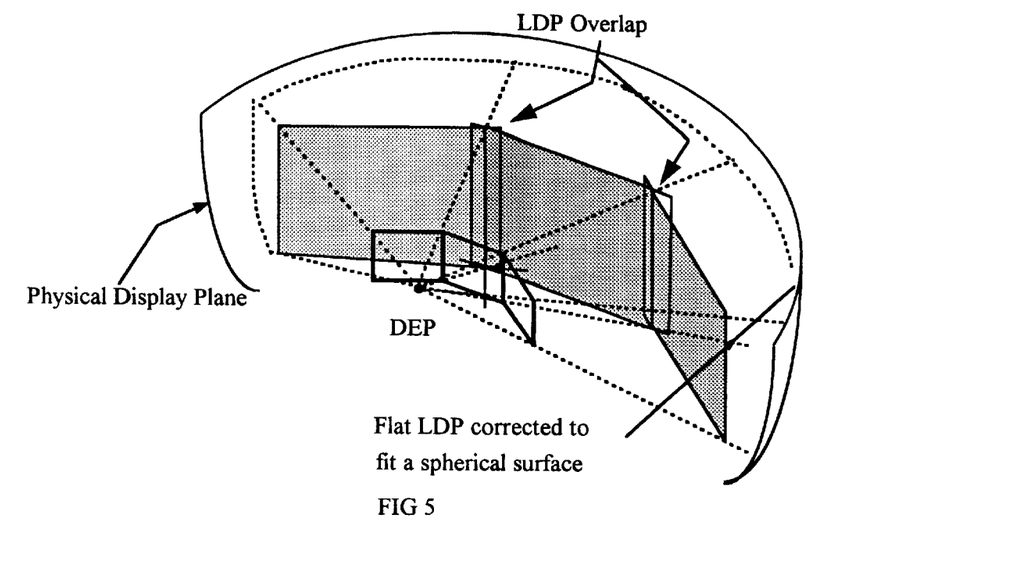
FIG. 5 shows an ideal logical display plane mapping with projection from a design eye point.

Ideally, all projection channels would project from an eye point. FIG. 5 illustrates the equivalent operation required of a display system. Each computer image generator channel outputs data representing a scene of a simulated real world as viewed through an imaginary window, typically rectangular in shape. The data takes the form of an array of picture elements or pixels, each usually defined in full red, green and blue digital colour information. To determine the content of each pixel, the computer image generator effectively draws a straight line from the eye point, through the window, to the database until it intersects a point. According to the point cover and intensity, the corresponding pixel data is determined and stored in the array. This process is applied to all array pixels. The data is then output to the projector, typically after conversion to separate red, green and blue analogue voltages. The data is typically sequenced in a raster format, similar to that used in television, where "frames" of video are produced at a fixed rate, each frame containing a number of "lines" of pixel data. Such a repetitive video sequence is suitable for display by conventional display devices such as cathode ray tube monitors and cathode ray tube projectors.

Figure 6:
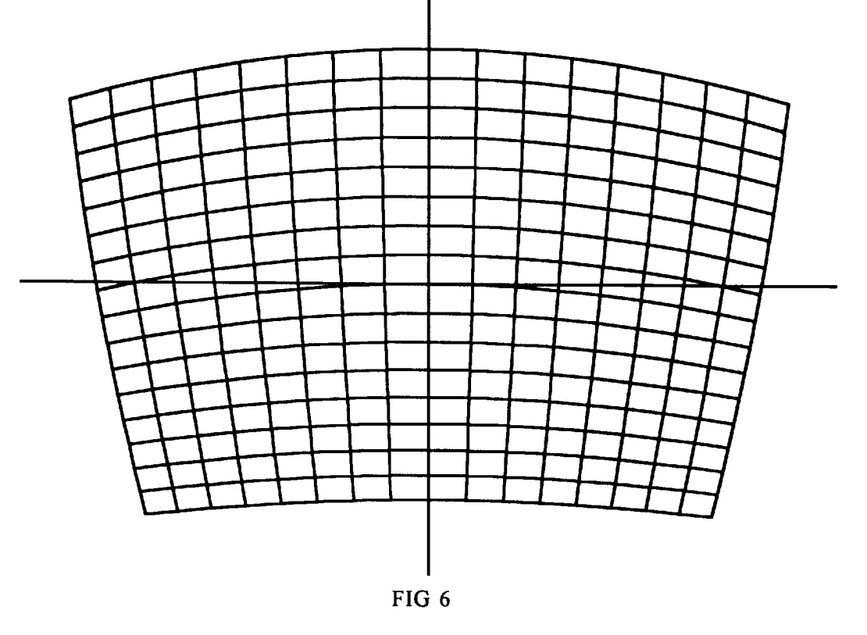
FIG. 6 shows typical distortion of a cathode ray tube faceplate image (raster) required for correct geometric mapping to the eye point of a person using simulation apparatus.

Projected simulation displays, especially multi-channel displays, are generally realized by "off-axis" projection arrangements as shown in FIGS. 1–4. In such arrangements, the projectors are placed away from the eye point, both in distance and axis, in order simultaneously to meet the total requirement without shadowing or image occlusion by simulator hardware. Such placement results in the need to distort the geometric placement of the computer image generated pixels at the image plane of the projector, as the equivalent rectangular windows need to appear correct when viewed on the curved surf ace of the screen. This may be done by changing the shape of the computer image generated windows and the pixel distribution within the corresponding array, but it is more often achieved in multi-channel systems by the projector itself distorting the rectangular image into a shape similar to that illustrated in FIG. 6. The ability to apply such geometric distortions at the image display plane is confined to a few display technologies of which cathode ray tube projectors are especially suited. However, the cathode ray tube projectors suffer a number of undesirable attributes, most notably complexity, stability, limited operational life, size and mass. Still further, the cathode ray tube projectors are such that multiple projection lenses are required to project separate red, green and blue images that must be converged on to the surface of the screen.

If desired, image scanning processes other than raster scanning may be employed, especially with fixed-matrix image display projection devices. The use of such other image scanning processes would be usable in displays for simulation and leisure with appropriate geometric accuracy and continuity between channels.

Figure 7:
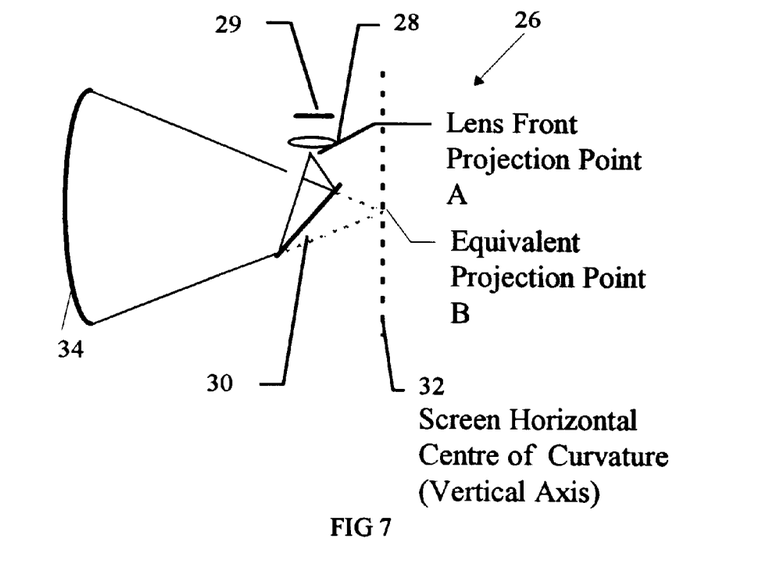
FIG. 7 illustrates a method of folding an individual projection point to a vertical screen axis (horizontal centre of curvature)
Figure 8:
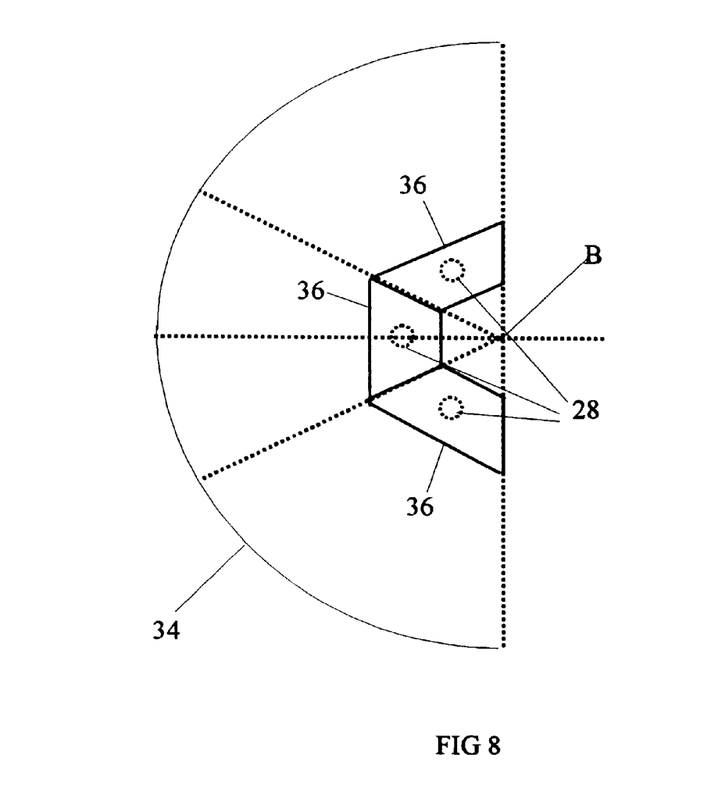
FIG. 8 is a plan view of a folding arrangement and shows how multiple channels all project from a single equivalent point.

The present invention provides a means to use fixed projection display devices without the need to apply corrections, whilst maintaining total display requirements. One advantage is the ability to use fixed matrix projection display devices which offer as compared with cathode ray tube projector devices, advantages as regards stability, size and mass (for a given light output), reliability, long operational life, low maintenance requirements, and the ability to use a single lens to project a full colour image. Another advantage is that, by eliminating the distortion correction requirement, the projection device may be simplified and of lower cost. FIGS. 7 and 8 illustrate the principle of the present invention.

FIG. 7 illustrates an image display system 26 comprising a projection lens 28 and a fold mirror 30. The projection lens 28 has a lens front projection point A. The screen has a horizontal centre of curvature 32 (vertical axis).

FIG. 7 illustrates the principle whereby the front projection point A of the projection lens 28 is positioned such that it projects along an axis other than the radius of a screen 34, in this example normal to it. A projection device image plane 29 is as shown. The fold mirror 30 is placed at a suitable position and orientation such that the equivalent projection point as referenced to the screen 34 is in position B. For correct geometric projection, this equivalent projection point B should lie on the vertical axis of the screen 34. However, acceptable results may also be achieved with the equivalent projection point B displaced from it. The size of the fold mirror 30 and the focal length of the projection lens 28 are selected such that the image cone angle emitted from the projection lens 28 at least covers the required channel field of view, including any overlap requirements.

Referring now to FIG. 8, similar parts as in FIG. 7 have been given the same reference numerals for ease of comparison and understanding. In FIG. 8, it will be seen that three projection lenses 28 are employed. FIG. 8 illustrates how the principle of FIG. 7 is applied to three channels of projection. Three trapezoidel shaped mirrors 36 are radially whilst also vertically arranged as shown in FIG. 7. For clarification, the projection lenses 28 are indicated as dotted circles within the outlines of the mirrors 36. Such an arrangement places all three equivalent projection points at or near one single equivalent projection point B, when referenced to the screen 34.

Figure 9:
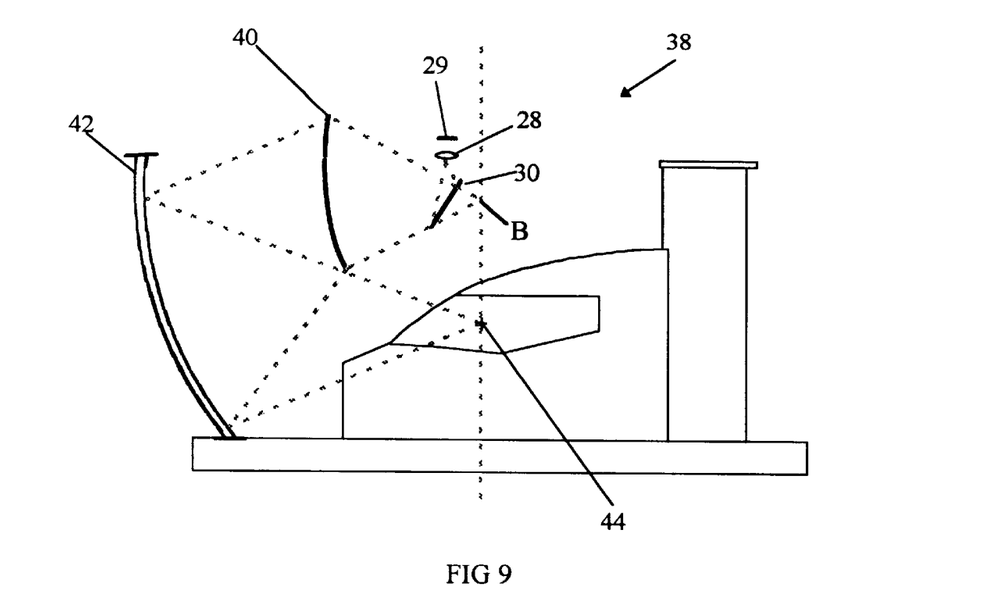
FIG. 9 is a side view of a collimated projected image display system utilizing the folding technique shown in FIGS. 7 and 8.

FIG. 9 shows a collimated projection image display system 38 comprising a rear projection screen 40 and a collimating mirror 42. The image display system 38 has a design eye point 44. The collimated optical system is such that the equivalent eye point lies on the vertical axis of the rear projection screen 40. FIG. 9 illustrates the application of a folding technique to a collimated projection display system.

Figure 10:
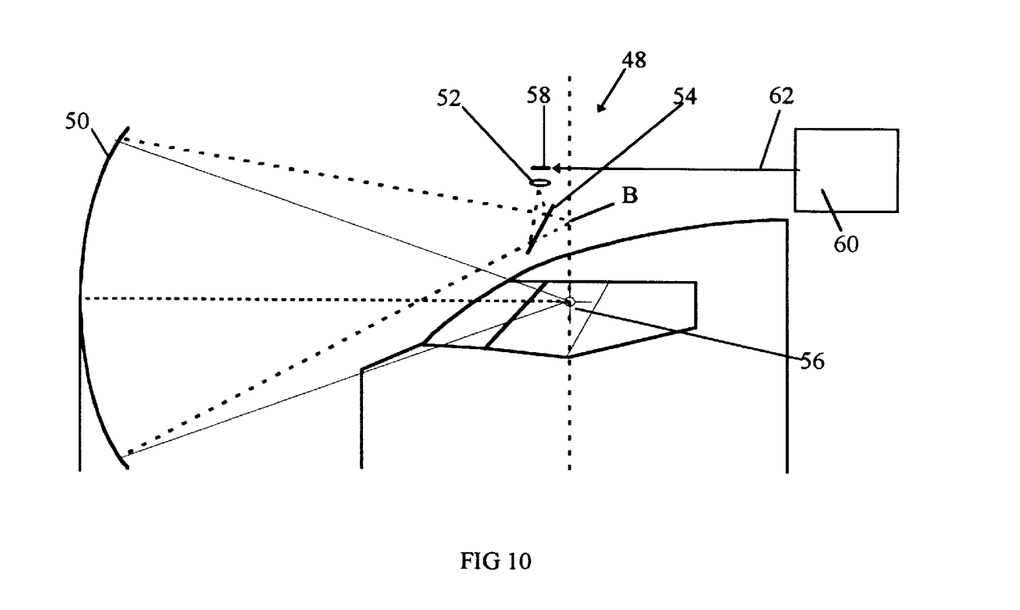
FIG. 10 is a side view of a direct view front projection image display system utilizing the folding technique shown in FIGS. 7 and 8.

FIG. 10 shows a direct view front projection image display system 48 having a screen 50, a lens 52 and a mirror 54. The image display system 48 has a design eye point 56. A projection device image plane 58 is shown. An image generator 60 provides images along path 62. FIG. 10 illustrates how the folding technique can be applied to a real image projection system, where the equivalent eye point is the design eye point 56 itself. As shown in FIG. 10, the projection point to eye point separation is significant. If the simulation system utilizes a cockpit such as in a car, then a relatively small separation may be possible.

Figure 11:
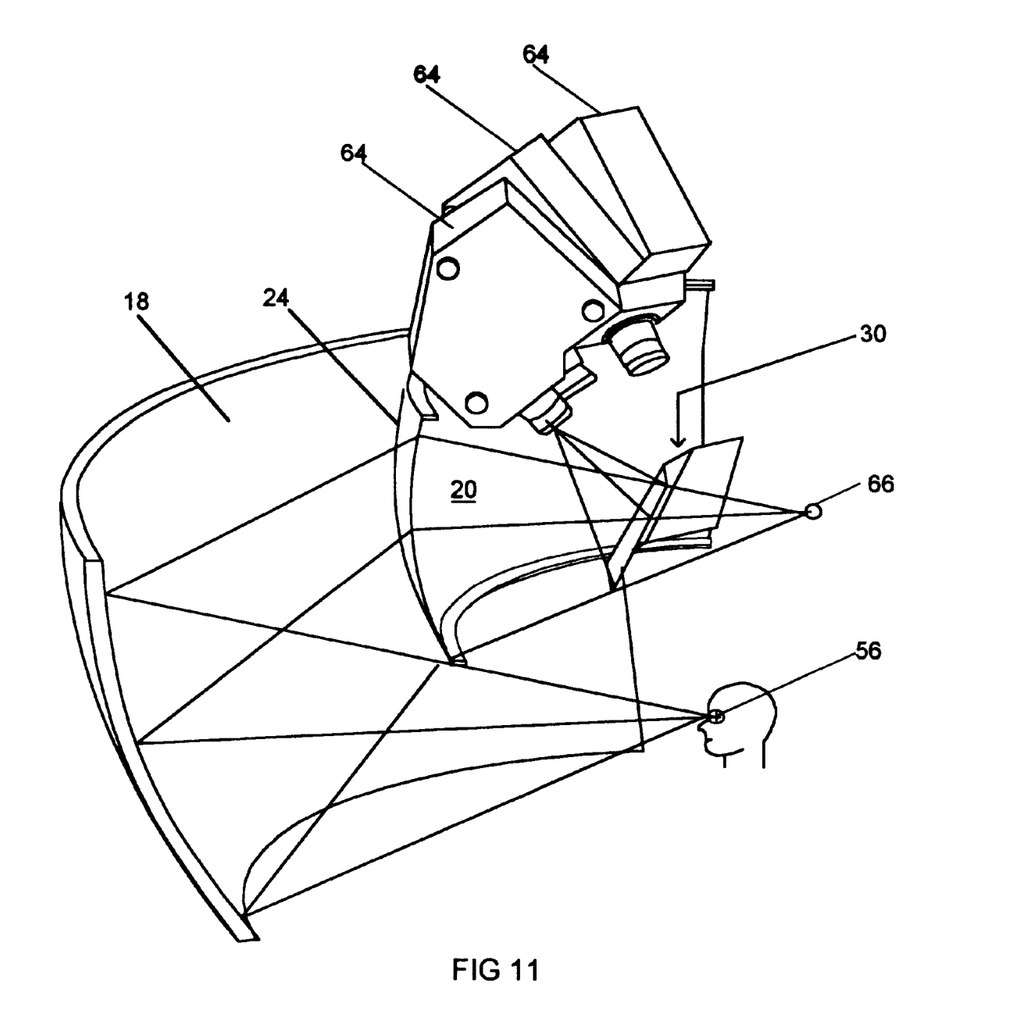
FIG. 11 shows an image projection display system.

FIG. 11 is a perspective view of an image projection display system of the invention. Similar parts as in previous Figures have been given the same reference numerals for ease of comparison and understanding. It will thus be seen that FIG. 11 comprises a collimating mirror 18, and a rear projection screen 20 with an outer surface 24. A fold mirror arrangement 30 is employed together with three projection devices in the form of three video projectors 64. During operation of the image projection display system shown in FIG. 11, light beams from the projectors 64 are optically combined so as to appear to be projected from essentially a common equivalent eye point 66, such that the displayed information of adjacent projected displays is able to be correctly aligned with respect to the design eye point 56 without the need to apply distortion to the images.

It is to be appreciated that the embodiments of the invention described above with reference to the accompanying drawings have been given by way of example and that modifications may be effected. Thus, for example, the mirrors 36 may be spaced apart instead of being abutted. More specifically, the mirrors 36 may be separated to help cope with unwanted light spillage. If desired, a central fold mirror of a set of three mirrors may be omitted, and the corresponding projector placed at or near the location of the common equivalent projection point. The video projectors 64 are preferably liquid crystal display video projectors, but other video projectors may be employed.

We claim:

1. An image projection display system (48) for use in large field-of-view presentation, which image projection display system (48) comprises a fold mirror arrangement (30) and a plurality of projection devices (64), characterised by the projection devices (64) having an apparent common projection point, and the image projection display system (48) being such that light beams from the projection devices (64) are optically combined by the fold mirror arrangement (30) so as to appear to be projected from essentially a common equivalent eye point (66) such that the displayed information of adjacent projected displays is correctly aligned with respect to a design eye point (56) without the need to apply distortion to the images.

2. An image projection display system (48) according to claim 1 in which the images are formed on a back projection screen (20) which is viewed via a concave mirror (18) to provide an essentially collimated display, said image projection display system (48) being such that the common projection point is located sufficiently close to the equivalent eye point (66) to ensure required geometrical accuracy.

3. An image projection display system (48) according to claim 1 in which the images are formed on a screen which is viewed directly by the user, said image projection display system (48) being such that the common projection point is located sufficiently close to the equivalent eye point (66) to ensure required geometrical accuracy.

4. An image projection display system (48) according to claim 1 in which the fold mirror arrangement (30) performs optical blending between adjacent channels so that essentially constant luminance across the region of overlap of adjacent projected images is able to be achieved.

5. An image projection display system (48) according to claim 1 in which the projection devices (64) are fixed matrix image display projection devices (64).

6. Large field-of-view presentation apparatus comprising an image projection display system (48) according to claim 1, and a computer image generator.

7. Large field-of-view presentation apparatus according to claim 6 in which the computer image generator includes a simulated real world database.

* * * * *